June 1, 1926.
C. F. HILGER ET AL
1,587,312
PAPER HANGER'S AND PAINTER'S TRESTLE
Filed March 26, 1923
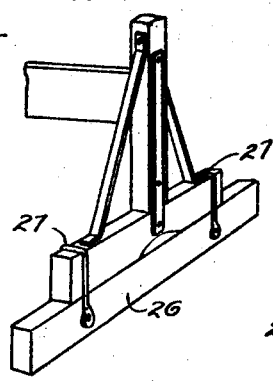
FIG.4
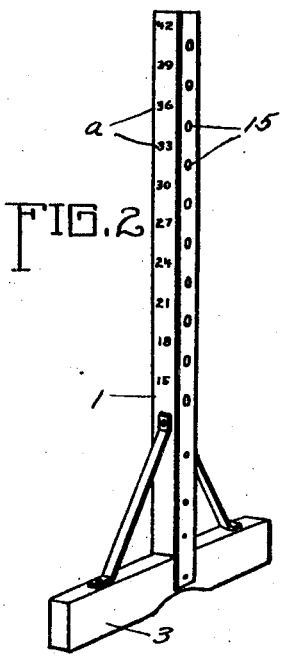
FIG.2
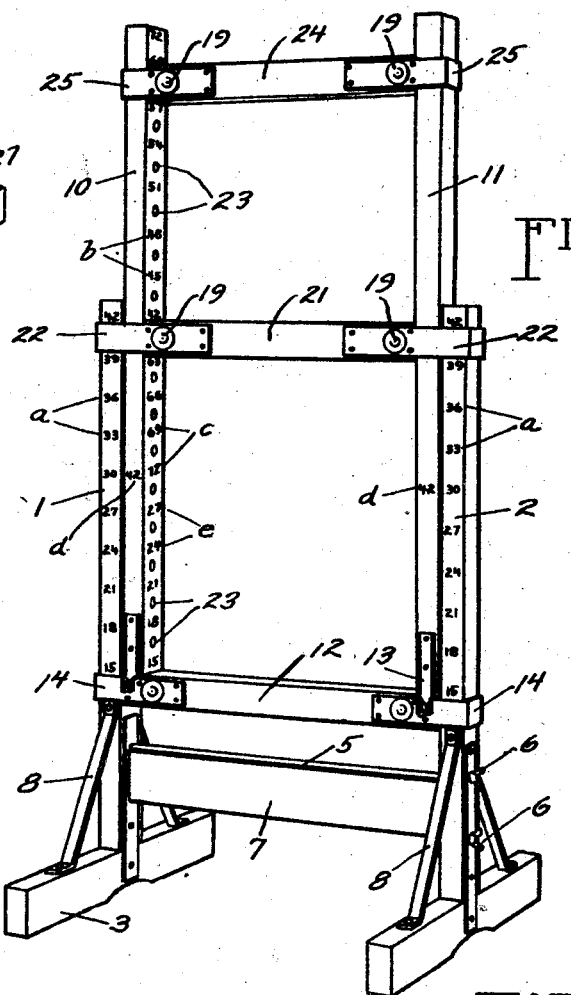
FIG.1
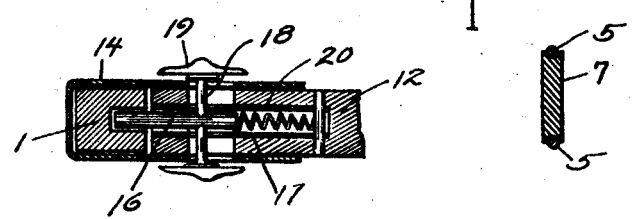
FIG.3
FIG.5
INVENTORS
Charles F. Hilger and
Benjamin F. Hilger,
By Walter N. Haskell.
Their ATTORNEY.

Patented June 1, 1926.

1,587,312

UNITED STATES PATENT OFFICE.

CHARLES F. HILGER AND BENJAMIN F. HILGER, OF STERLING, ILLINOIS.

PAPER HANGER'S AND PAINTER'S TRESTLE.

Application filed March 26, 1923. Serial No. 627,572.

Our invention pertains to a paper hanger and painter's trestle, and aims to provide certain improvements over a similar device for which an application for Letters Patent of the United States was filed by us on the twenty-sixth day of March, 1921, Serial No. 455,932.

One of the purposes of the present invention is to provide a frame construction having the desired amount of rigidity when in use; and which can be quickly taken apart for the purpose of transportation or storage, and as quickly put together again.

Another purpose of the invention is to provide a vertically extensible supporting frame, which can be raised to a suitable height for ordinary uses of such devices.

Another purpose of the invention is to provide a system of numbers of a novel arrangement, for indicating the point to which the device is to be raised, as well as its position after having been adjusted.

The above mentioned, and other features and advantages of the invention will more fully appear from the following specification taken in connection with the accompanying drawings, in which:

Fig. 1 shows one of the devices, in perspective.

Fig. 2 is a detail, in perspective, of one of the supports.

Fig. 3 is a sectional view of one of the latches 16.

Fig. 4 is a detail of a supplemental base for the machine.

Fig. 5 is a cross-section through the cross-bar 7.

The device embodies a main stationary frame, and an auxiliary frame vertically movable therein, the first-named frame comprising a pair of supports 1 and 2, fixed to cross-pieces 3 and 4, which provide a suitable base for the trestle. The posts 1 and 2 are united by a pair of spaced rods 5, threaded on one end to receive wing-nuts 6, and between said rods is held a cross-brace 7, the edges of which are channeled slightly to receive such rods, and prevent release of the brace. The supports 1 and 2 are further attached to the bases 3 and 4 by means of braces 8.

Within the frame formed by the pieces 1 and 2 is a similar frame formed of side pieces 10 and 11, and movable within the main frame. The last-named pieces are united at their lower ends with a cross-bar 12, by means of bolts passing through the ends of the bar 12, and through metal straps 13 secured to the parts 10 and 11. The ends of the bolts are threaded and provided with wing-nuts, so that the parts 10 and 11 and bar 12 can be quickly disconnected, when desired. To the ends of the bar 12 are secured loops 14, passing round the posts 1 and 2, and slidable thereon. The ends of the bar 12 are detachably connected with the posts 1 and 2 by means similar to those shown in said former application, consisting of series of holes 15 on the inner faces of the posts, and catches 16 slidable in housings 17 in the ends of the bar 12, and adapted to enter said holes at their outer ends. Said catches are operable by means of pins 18, provided on their ends with buttons 19, for engagement by the thumb and finger of the operator. When in position, the catches are held from accidental release by means of a coiled spring 20 in the inner end of the housing 17. By this arrangement the operator, by making use of both of his hands, can release and adjust both ends of the bar at the same time.

At a distance above the bar 12 is a similar bar 21, of suitable length to have a free vertical movement between the uprights 10 and 11, to the ends of which bar are fixed loops 22, encircling the posts 1 and 2, and slidable thereon. The ends of the bar 21 are fitted with locking devices similar to those of the bar 12, for engagement with a series of openings 23 in the inner face of the pieces 10 and 11, and operable in the same manner by means of buttons 19.

At the upper end of the uprights 10 and 11 is a bar 24, similar to the bar 21, and provided at its ends with loops 25 for a slidable engagement with the uprights. The bar 24 is also provided at its ends with locking means for engagement with the holes 23, said locking means being of the character hereinbefore set forth. By this means the bar 24 can be held securely in adjusted positions at points above the bar 21.

It will be understood that in actual use two of the devices would be employed, each of which would be designed for the support of one end of a plank or platform. When used for the lower heights the plank would be supported on the bar 12, which has a range of approximately two feet. In practice it is found to be convenient to have the holes 15 three inches apart, and numbers are provided on the faces of the supports 1 and 2, which indicate the height of the bar from the ground. The bar 21 is normally at a point with its upper face forty-two inches from the ground, as shown in the drawings, and said bar can also be used for the support of a plank, a limited number of adjustments thereof being possible on the upper ends of the posts 1 and 2, taking the place of the bar 12. When the bar 21 is thus in use the bar 24 can be removed, if desired, giving free passage between the posts 10 and 11.

For supporting a plank at a higher point the bar 24 is employed, the normal position thereof being at a point sixty inches from the ground, as set forth in the present embodiment. The inner face of the pieces 10 and 11 are provided with numbers indicating the height of the bar 24. When the device is in its normal position, with the movable frame at its lowest point, the number 42 appears above the bar 21, in line with the similar reference number on the upper ends of the posts 1 and 2. From this point the numbers run up to 60, which is the highest point that can be attained by the bar 24, by adjustment thereof. Said bar can be moved downwardly, however, to the 45-inch position, and locked therein, or at any of the intermediate heights. When it is desired to support a plank above the 60-inch mark, the bar 12 is disconnected at its ends, and moved upwardly the desired number of inches. Before this is done, however, the bar 21 is released and moved downwardly an equivalent distance. For instance, if the inner frame is to be raised six inches the bar 21 is moved downwardly six inches, and locked in that position. Then, when the frame is raised, the bar 21 is brought back to its normal position. The openings 23 below the bar 21 are numbered downwardly, as at $c$, from 63 to 72, said numbers acting as a gauge to show the point at which the bar 21 should be set. For instance, if the inner frame is to be raised 12 inches the bar 21 is moved downwardly and secured, with the numbers 72 showing just above the same. When the frame is raised, these numbers 72 appear, in line with the numbers 42 on the ends of the posts 1 and 2, showing that the bar 24 is at the height of 72 inches. On the outer faces of the uprights 10 and 11, in line with the numbers 72, are the numerals 42, as at $d$. When the device is at the 72-inch elevation these numbers also appear above the bar 21, in line with the outer numbers 42.

Additional holes are provided on the inner faces of the uprights 10 and 11, as shown at 23, such holes permitting a still higher adjustment of the movable frame. This use of the machine is attended with some risk, however, partly on account of the height attained by the bar 24, and partly on account of the reduced spacing of the bars 21 and 12, and the greater leverage exerted by the upper part of the movable frame. The openings on the inner faces of the uprights 10 and 11 are marked to correspond with those on the posts 1 and 2, as indicated at $e$, and these numbers are designed more for use by the operator, to show him that the latches at the opposite ends of the bar 21 are in corresponding openings in the uprights.

The bar 21 not only serves as a cross-piece for the support of a plank, but it also acts as a movable gauge to indicate the height to which the inner frame is to be moved. It also operates as a brace, to hold the upper ends of the supports 1 and 2 from spreading, or otherwise getting out of place. For this reason the position of such bar should at all times be at or near the upper ends of the supports. The bar 24 in the same way acts as a brace for the upper ends of the pieces 10 and 11, such pieces being further braced at points lower down by the bar 21.

To take the device apart, the bar 24 is disconnected at its ends and slipped off the ends of the pieces 10 and 11. The bar 21 is similarly removed, and the lower ends of the pieces 10 and 11 disconnected from the bar 12. These pieces are then free, and the bar 12 is disconnected from the posts 1 and 2 and slipped from the upper ends thereof. By removal of the rods 5 the frames 1 and 2 are then separated, and all of the parts of the device can be packed in a compact space. By a reversal of the above named operations, the trestle can again be quickly assembled, ready for use.

The height of the trestle can be increased by using frames of greater length than those set forth herein, but in the use of such longer frames there is danger of the trestle tipping or rocking upon the cross-pieces 3 and 4. To prevent this we provide a supplemental base piece 26, shown in Fig. 4, and provided near its ends with loops 27, which are pivoted to the sides of the base 26, and pass over the ends of the pieces 3 and 4. The pieces 26 project beyond the pieces 3 and 4 at each end, and provide a more sure foundation for the trestle.

What we claim, and desire to secure by Letters Patent, is:

1. A device of the class described, comprising a stationary frame, provided at intervals with catch-engaging devices; an auxiliary frame vertically slidable in said stationary frame, and provided at its lower end with means for engagement with said catch-engaging devices, provided also at intervals with catch-engaging devices; a cross-bar slidable on said auxiliary frame, provided with means for releasable engagement with the catch-engaging devices thereof; and a cross-bar slidable on said stationary frame, also provided with means for releasable engagement with the catch-engaging devices of said auxiliary frame.

2. A device of the class described, comprising a pair of side frames detachably connected, supported on suitable bases, and provided at intervals on their inner faces with catch-engaging devices; an auxiliary frame slidable within said side frames, provided at intervals with catch-engaging devices, said frame including a cross-bar detachably connected therewith, and provided with means for releasable engagement with the catch-engaging devices on said main frame; a cross-bar provided at its ends with means for slidable engagement with both of said frames, and provided with means for releasable engagement with the interlocking means of said auxiliary frame; and a cross-bar slidable on said auxiliary frame and provided with means for releasable engagement with the interlocking means on said auxiliary frame, all of said cross-bars being removable from said frames upon being released.

3. A device of the class described, comprising a stationary frame, provided at regular intervals with catch-engaging devices, an auxiliary frame vertically slidable in said stationary frame, fitted at its lower end for releasable engagement with said catch-engaging devices, and also provided with series of catch-engaging devices; a cross-bar slidable on said stationary frame, forming a brace therefor, and provided with means for releasable engagement with the catch-engaging devices of said auxiliary frame; and graduated markings on the face of said stationary frame, to show the height of the auxiliary frame from the ground.

4. A device of the class described, comprising a main frame, formed of spaced uprights, having openings at intervals in their inner faces, and provided on their outer faces with graduated scales; a cross-bar slidable between said uprights and provided at its ends with spring-controlled bolts for engagement with said openings, to hold said bar in adjusted positions, vertically; uprights supported on said bar, and vertically movable therewith, provided in their inner faces with series of openings and graduated scales relating thereto; a cross-bar slidable on said last-named uprights, and provided in its ends with spring-controlled bolts for engagement with the openings therein; a cross-bar provided at its ends with loops embracing both sets of uprights, permitting vertical movement of said last-named cross-bar, and having spring-actuated bolts in its ends for engagement with the openings in said movable uprights; and additional graduated scales on said movable uprights, to show to what point said last-named bar is to be moved to indicate the degree of movement upwardly of the movable uprights to attain a desired height.

In testimony whereof we affix our signatures.

CHARLES F. HILGER.
BENJAMIN F. HILGER.